United States Patent [19]

Lee et al.

[11] Patent Number: 5,329,540
[45] Date of Patent: Jul. 12, 1994

[54] SILICATE GEL DYE LASER

[75] Inventors: Ilzoo Lee; Josephine Covino-Hrbacek, both of Ridgecrest, Calif.

[73] Assignee: The United States of America as represented by the Secretary of the Navy, Washington, D.C.

[21] Appl. No.: 51,106

[22] Filed: Mar. 31, 1993

[51] Int. Cl.⁵ .................................. H01S 3/20
[52] U.S. Cl. ..................................... 372/53
[58] Field of Search ......................... 372/53

[56] References Cited

U.S. PATENT DOCUMENTS 4,878,224 10/1989 Kuder et al. .................. 372/53

Primary Examiner—John D. Lee
Assistant Examiner—Robert E. Wise
Attorney, Agent, or Firm—John L. Forrest, Jr.; Melvin J. Sliwka; Stuart H. Nissim

[57] ABSTRACT

A dye laser comprising a solid styate laser medium and a pumping energy source, the laser medium comprising a lasing concentration of a water or alcohol soluble organic dye which is incorporated into a hydrolyzed silicon organometallic solution, and forming a gel which is dried to form a transparent silicate glass which is doped with the organic dye.

8 Claims, No Drawings

SILICATE GEL DYE LASER

BACKGROUND OF THE INVENTION

Organic laser dyes have found wide use in different fields of science and technology including spectroscopy, optics, and laser. These and other applications are discussed by T. W. Hansch in "Applications of Dye Lasers," chapter 5 of Dye Lasers, F. P. Schafer, ed. (Springer-Verlag, New York & Heidelberg, Berlin 1973). The lasing media based on organic dyes may be in the form of solids, liquids or gas. This lasing media causes spectral shifts of both absorption and emission and it affects photochemical stability. It also alters the distribution between processes that the excited states may undergo. For example, intersystem crossing where a molecule excited to the first excited singlet state may enter the system of triplet states and relax to the lowest level. Although polymers are the earliest and the most common solid state host for organic laser dyes, they are limited in their low photostability and low thermal stability. For example, incorporation of Rhodamine 6G in the mixture of MMA (methyl methacrylate) and PMMA showed a laser efficiency of 36%, but it was photounstable. Because of the poor thermal stability of the laser dyes, solid state dye lasers had been restricted to the polymeric hosts. Embedding organic dyes into a silicate glass would have significant advantages over the other types of matrices. Silicate glasses are photochemically inert and can enhance the thermal stability of most organic dyes. Sol-gel methods, with their low processing temperature, would make it possible to incorporate a dye into a transparent inorganic matrix.

There are many new water soluble, low threshold, fluorophoric laser dyes with good lasing characteristics, broad tuning ranges and superior photochemical stability. Therefore, it would be particularly desirable to incorporate organic laser dyes into a silicate glass host.

SUMMARY OF THE INVENTION

Accordingly, one object of this invention is to provide novel solid state dye lasers which use a silicate glass as the host.

Another object of this invention is to provide dye lasers which use dyes having good photochemical stability.

A further object of this invention is to provide dye lasers which can be tuned over a relatively broad range of emission spectra.

Still another object of this invention is to provide a method of producing a solid state laser medium which incorporates an organic laser dye in a silicate glass host.

These and other objects of this invention are achieved by providing: a water or alcohol soluble organic dye which is incorporated into a hydrolyzed silicon organometallic, solution, and forming a gel which is dried to form a silicate glass which is doped with the organic dye. These dried gels are used as the lasing material to construct a pumped laser.

DETAILED DESCRIPTION AND PREFERRED EMBODIMENTS

A sol comprising a silicon organometallic, water, and an alcohol, is doped with an organic laser dye. This sol undergoes an irreversible sol-gel transition to a rigid transparent gel. Solvent is then removed with ordinary evaporation.

The silicon organometallic can be any one or a mixture of precursors for forming silica based glass, such as boro silicates, alumino silicates, phospho silicates. Two preferred silicon organometallics are tetraethylorthosilicate (TEOS) and tetramethytlorthosilicate (TMOS). The water is present from 1 to 20 moles per mole of silicon organometallic, preferably 4 moles for making a film and 16 moles for making a monolith. The alcohol is present from 1 to 6 moles per mole of silicon organometallic, preferably about 4 to about 5 moles. The alcohol used is partially dependent upon the dye used, preferably ethanol or methanol.

The laser dye used can be any water or alcohol soluble, organic laser dye and salts thereof. A preferred class of dyes can be represented by the formula

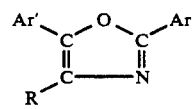

wherein,
R is H or $CH_3$;
Ar is selected from

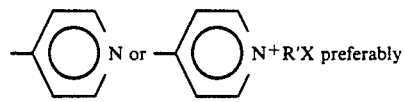

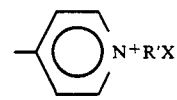

wherein
R' is —H, or an alkyl from 1 to 10 carbon atoms, preferably —$CH_3$,
X is an anion, preferably p—$CH_3C_6H_4SO_3$; and,
Ar' is

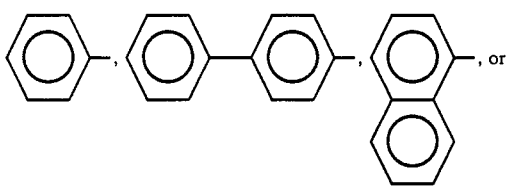

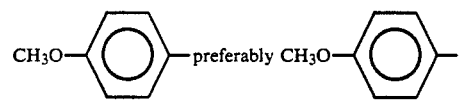

The dye is added to the sol of water, silicon organometallic and alcohol, preferably dissolved in the water or the alcohol in a concentration of about $10^{-5}$ to $10^{-3}$ moles of dye per liter of alcohol.

The gel formation can be catalyzed by the addition of about 0.01 to 0.3 moles of an acid such as: HCl, $HNO_3$HF, or acetic acid, preferably about 0.01 moles.

In preferred practice of the sol-gel method of this invention, the silicon organometallic, water, and alcohol containing the dye, are combined to form the sol. The acid catalyst, if any, is added to the sol, and the sol is then mixed for at least 30 minutes at room temperature. The sol is then placed on a substrate as a film or in a mold to form a monolith, and dried at room temperature for a minimum of 4 weeks, preferably at least 4 to 6 weeks. The now formed gel is further dried in an oven at about 60° C. for about one week. The resulting gel is a transparent silica glass doped with the organic dye.

EXAMPLE 1

Detailed synthesis of a number of oxazole dyes can be found in U.S. Pat. No. 4,506,368. A sample synthesis of 2-(4-pyridyl)5-(4-methoxy phenyl) oxazole is as follows:

Isonicotinic acid (24.93 g., 0.0938 mole) and thionyl chloride (50 ml) is refluxed for 1 hour. The crude acid chloride which remains after removal of excess thionyl chloride at diminished pressure is dissolved in dry pyridine (200 ml) and p-methoxy phenacylammonium chloride (19.00 g, 0.938 mole) is added portion wise to the stirred solution. The addition is exothermic.. After the addition is completed, the reaction mixture is heated and stirred on a boiling water bath for 2 hours and then poured into ice-water to precipitate the product. The solid is collected and dried under reduced pressure to give α-isonicotinamido-p-methoxyacetophenone m.p. 227°–230° C. (with decomposition). α-isonicotinamido-p-methoxyacetophenone (11.5 g., 0.043 mole) is added portion-wise to a stirred solution of 200 ml of acetic anhydride and 15 ml of 90% phosphoric acid; the addition is exothermic. After the addition is complete the reaction mixture is stirred and refluxed for 2 hours. After cooling, the supernatant liquid is decanted from the viscous precipitate, which is crystallized by titration with 350 ml of 1% aqueous sodium hydroxide. The yellow solid is filtered, washed with distilled water (200 ml), and dried in vacuo yielding 2-(4-pyridyl)-5-p-methoxyphenyloxazole, m.p. 105°–107° C.

Conventional techniques are used to convert the 4PyMPO to its quaternary salts.

EXAMPLE 2

A number of dried gels were made using 2-(4-pyridyl)-5-(4-phenyl) oxazole (4PyPO) and the n-methyl tosylate salt of 2-(4-pyridyl)5-(4-methoxy phenyl) oxazole as the dye. Three solutions of each dye in alcohol were made at concentrations of $10^{-3}$, $10^{-4}$, and $10^{-5}$ moles per liter. The 4PyPO was dissolved in methanol and the (4PyMPO-MePTS) was dissolved in ethanol. 5.06 ml of TEOS or 3.7 ml of TMOS was added to 1.8 ml of $H_2O$. To this was added 4.7 ml of methanol with 4PyPO or 6.82 ml of ethanol with 4PyMPO-MePTS. To this sol, 0.5 ml of HCl (0.01N) was added. The mixtures were stirred for about 30 minutes at room temperature. The gels were allowed to dry for 2 to 6 weeks at room temperature and further dried at 60° C. for about one week.

Thermal analysis of dyes incorporated in silica host were performed using a TA 2000 system. Thermogravimetric analysis (TGA, TA 2950) and differential scanning calorimeter (DSC, TA 2910) were performed from room temperature to 600° C. at 5° C./min. and 15° C./min. heating rate, respectively. The thermogravimetric analysis showed that all three of the dye-silica samples lost weight when heated to 600° C. (FIG. 2). This corresponds to a 20 to 25% weight loss. Approximately 5% of the weight loss between 110° C. and 120° C. was due to removal of physically adsorbed solvent molecules. The 15 to 20% weight loss between 500° C.–600° C. was due to the decomposition of residual organics and removal of chemically bonded water molecules. FIG. 3 shows the DSC curves for the silica xerogels with and without the presence of dyes (the insertion is the DSC curve for 4PyMPO-MePTS itself. It indicates that the xerogels with dyes have a much broader exothermic peak between 250°–350° C. than silica itself, indicating that organic molecules are being oxidized. It also shows that silica gel has a much narrow endothermic peak at 150 C. In contrast, the silica samples which have the incorporated organic dye have much broader endothermic peaks. This can be attributed to a combination of dye decomposition and silica dehydration.

EXAMPLE 3

Fluorescence spectra of dried gels prepared in example 2 using TMOS and dye solutions in alcohol at concentrations of $10^{-4}$ moles per liter. These spectra were obtained using the harmonic output of a pulsed Nd:YAG laser at 355 nm for both 4PyPO and 4PyMPO-MePTS. The data was collected using a Monochromator, a photomultiplier, a boxcar averager, and stored on a digital oscilloscope (Nicolet 4094). Fluorescence life time was measured using the same setup except the boxcar averager was bypassed. Absorption spectra of the dried gels were measured on a Cary 2390 spectrophotometer with V-block sample holder.

Table 1 summarizes the absorption and emission spectra of dyes in silica gel and solution.

TABLE 1

| | Emission and excitation characteristics of 4PyPO and 4PyMPO—MePTS in silica gel. | | | | |
|---|---|---|---|---|---|
| | IN SOL-GEL SILICA MATRIX | | | IN SOLUTION | |
| DYE | Fluorescence maximum | Absorption Maximum | Fluorescence lifetime (ns) | Fluorescence maximum | Absorption Maximum |
| 4PyPO | 493 | — | 12.5 | 380 in toluene [13] | 325 in Et(OH) [13] |
| 4PyMPO—MePTS MePTS | 568 | 408 | 10 | 562 in Et(OH)/$H_2O$ | 397 in Et(OH)/$H_2O$ |

Obviously numerous modifications and variations of the present invention are possible in light of the above teachings. It is therefore to be understood that within the scope of the appended claims the invention may be practiced otherwise than as specifically described herein.

What is claimed is:

1. A dye laser comprising a laser dye gel and a pumping energy source operably coupled therewith and capable of producing stimulated emission of the dye gel, the dye gel comprising a lasing concentration of an organic dye soluble in water or alcohol in a transparent silica gel, wherein the organic dye has the formula:

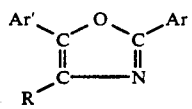

wherein,

R is H or CH$_3$;

Ar is selected from the group consisting of

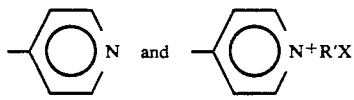

wherein

R' is —H, or an alkyl from 1 to 10 carbon atoms,

X is an anion; and,

Ar' is selected from the group consisting of

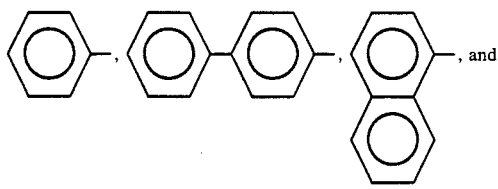

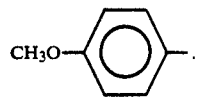

2. The dye laser of claim 1 wherein the organic dye is 2-(4-pyridyl)-5-(4-phenyl) oxazole.

3. The dye laser of claim 1 wherein the organic dye is a quaternary salt of 2-(4-pyridyl)5-(4-methoxy phenyl) oxazole.

4. The dye laser of claim 1 wherein said laser dye gel is made by the following steps:

(a) making a sol by adding about 4 to 16 moles of water to about 1 mole of a silicon organometallic selected from the group consisting of TMOS and TEOS;

(b) making a solution of an oxazole dye in alcohol at a concentration ranging from $10^{-5}$ to about $10^{-3}$ moles per liter;

(c) adding 4 moles of alcohol, containing the dye, to the water and silicon organometallic solution;

(d) mixing the resulting sol at room temperature for at least 30 minutes;

(e) placing the sol in a mold or on a substrate;

(f) drying the sol at room temperature for at least 2 weeks to form a gel; and (g) drying the gel at about 60° C. for at least 1 week.

5. The dye laser of claim 4 wherein the fabrication further comprises the step of adding an acidic catalyst to the sol before mixing.

6. The dye laser of claim 5 wherein said acid catalyst is added in the amount of about 0.01 moles to about 0.3 moles.

7. The dye laser of claim 6 wherein said acid catalyst is HCl.

8. The dye laser of claim 1 wherein said silicon organometallic is selected from the group consisting of TMOS and TEOS.

* * * * *